United States Patent
Sigg et al.

(10) Patent No.: US 8,385,314 B1
(45) Date of Patent: Feb. 26, 2013

(54) METHOD AND SYSTEM FOR MODIFYING A DATA-SYNCHRONIZATION INTERVAL BASED ON NUMBER OF TERMINALS BEING SERVED IN THE COVERAGE AREA

(75) Inventors: Jason P. Sigg, Overland Park, KS (US); Maulik K. Shah, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 319 days.

(21) Appl. No.: 12/897,213

(22) Filed: Oct. 4, 2010

(51) Int. Cl.
*H04J 3/16* (2006.01)
*H04J 3/06* (2006.01)

(52) U.S. Cl. .......................... 370/346; 370/350
(58) Field of Classification Search .................. 370/346, 370/350
See application file for complete search history.

(56) References Cited

U.S. PATENT DOCUMENTS

| | | | |
|---|---|---|---|
| 6,141,570 | A | 10/2000 | O'Neill, Jr. et al. |
| 7,283,555 | B2 | 10/2007 | Duncan et al. |
| 7,689,223 | B1 | 3/2010 | Lewis |
| 2002/0159434 | A1* | 10/2002 | Gosior et al. ................. 370/350 |
| 2004/0024910 | A1* | 2/2004 | Marl et al. .................... 709/248 |
| 2004/0252669 | A1 | 12/2004 | Hosein |
| 2006/0056336 | A1 | 3/2006 | Dacosta |
| 2007/0162582 | A1* | 7/2007 | Belali et al. ................... 709/223 |
| 2008/0037593 | A1* | 2/2008 | Friedman et al. ............. 370/503 |

OTHER PUBLICATIONS

Unpublished U.S. Appl. No. 11/038,944, filed in the name of Jason Sigg and Hector M. Ribas, entitled "Method and System for Dynamic Adjustment of Radio Frequency Registration Period Based on Load Conditions".

* cited by examiner

Primary Examiner — Kenny Lin (57) ABSTRACT

Disclosed are methods and systems for modifying a data-synchronization interval for an access terminal based on a number of access terminals being served by a wireless access point in a coverage area. In at least one embodiment, an access terminal periodically polls at least one network device via the access point for synchronization data according to a first data-synchronization interval. The access terminal receives from the access point information indicative of a number of access terminals being served by the access point in the coverage area. The access terminal determines a second data-synchronization interval based at least in part on a comparison of the number to a threshold value. Subsequent to determining the second data-synchronization interval, the access terminal periodically polls the at least one network device for synchronization data according to the second data-synchronization interval.

26 Claims, 7 Drawing Sheets

METHOD AND SYSTEM FOR MODIFYING A DATA-SYNCHRONIZATION INTERVAL BASED ON NUMBER OF TERMINALS BEING SERVED IN THE COVERAGE AREA

BACKGROUND

More people than ever are using mobile stations, such as cell phones and personal digital assistants (collectively, access terminals), to connect to wireless wide area networks (WWANs), each of which (or a plurality taken together) may also be referred to as a radio access network (RAN), and by other names. Service providers typically operate RANs to provide both voice and data services using a wireless communication format (i.e., protocol).

In a typical RAN, a given access terminal communicates with one or more antennae of one or more of an entity known as a base transceiver station (BTS) via a radio-frequency (RF) air interface, thus establishing a communication path between the access terminal and the RAN. Also in a typical RAN, a given geographical area is divided into a number of smaller wireless-coverage areas such as cells and sectors, each having at least one associated BTS antenna, which are in turn coupled to an entity typically known as a base station controller (BSC), which is then coupled to at least one telecommunications switch or gateway, such as a mobile switching center (MSC) and/or a packet data serving node (PDSN), as examples.

A given switch or gateway may then be coupled with a transport network, such as the well-known PSTN (Public Switched Telephone Network) or one or more packet-switched networks (e.g., the Internet), a collection of two or more of which may for simplicity be referred to herein at times as a single packet-switched network, though this usage is for clarity of presentation, and not to imply a selection between the singular and the plural. Network devices with which an access terminal synchronizes may be disposed within the RAN itself and/or may be accessible via the PSTN, a packet-switched network, or some other network coupled to the RAN.

Moreover, cells in a given RAN are usually divided geographically into a number of sectors, each defined respectively by radiation patterns from directional-antenna components of respective BTSs, or by respective BTS antennae. These sectors (which can be visualized ideally as pie pieces) can be referred to as "physical sectors," since they are physical areas of a cell site. Therefore, at a given time, an access terminal in a RAN may be positioned in a given physical sector, and will thus be able to access voice and data services provided by the RAN via at least the BTS serving that physical sector.

The voice and data services may be used by one or more various applications running on an access terminal, such as e-mail clients, calendars, web browsers, video-streaming clients, mapping programs, games, social-networking tools, weather programs, etc. Each of these applications may be configured to periodically contact a network device via the RAN to receive new and/or updated data pertinent to the particular application. The period in between update requests is often and herein referred to as the data-synchronization interval. Various applications may be set to use different respective data-synchronization intervals. For example, an e-mail client may be configured to have a shorter data-synchronization interval than a weather application, as e-mail inboxes tend to change more often than the weather, and users typically expect near-real-time status of their e-mail.

Overview

In light of the foregoing, it would be advantageous for access terminals operating within a given RAN to be able to vary the amount of data traffic they create based on detected network conditions within the RAN. According to some wireless protocols, such as evolution-data optimized (EVDO), access terminals are provided with information indicative of network conditions. In accordance with this disclosure, access terminals can then use this information to responsively vary the amount of data traffic they transmit to the RAN.

For example, in the case of EVDO, according to the standards, a message known as a "QuickConfig" message is transmitted to access terminals informing them as to how many forward traffic channels are currently in use in the access terminal's current serving sector. Advantageously, access terminals can use this information to selectively increase, decrease, or perhaps maintain the amount of traffic the access terminal is transmitting to the BTS in its serving sector. In general, then, more access terminals can be served at a given time in a given sector without incurring the cost of expensive equipment upgrades at each BTS, as a result of, e.g., having access terminals dynamically decrease their bandwidth usage in response to a worsening of network conditions.

Disclosed herein are methods and systems for modifying access-terminal data-synchronization intervals based on a number of terminals being served in the access terminal's coverage area. In at least one embodiment, an access terminal, operating in a coverage area of a wireless access point (e.g., a BTS), periodically polls at least one network device via the access point for synchronization data according to a first data-synchronization interval. The synchronization data may comprise new data and/or updated data, as examples. For example, new data may include new e-mails recently received. Updated data may include, as examples, one or more of an updated weather forecast, an updated stock price, an updated score of an athletic game, etc.

In at least one embodiment, the access terminal then receives (or perhaps had already received), from the access point, information indicative of a number of access terminals being served by the access point in the access terminal's current coverage area. The information may include the actual number of access terminals, and/or some other information indicative of the number of access terminals, such as the number of forward traffic channels currently in use. In at least one embodiment, the information may comprise a QuickConfig message according to an EV-DO protocol. Other messages and other protocols could of course be used instead or in addition.

Responsive to receiving the information, the access terminal determines a second data-synchronization interval (different from the first) based at least in part on a comparison of the number of access terminals to a threshold value. For example, if the number of access terminals is greater than a first threshold number, for example twenty-five, the second data-synchronization interval might be selected so as to be longer than the first. In at least one embodiment, the duration of the second data-synchronization interval is selected to be between 1.25 and 3.5 times, inclusive, the duration of the first data-synchronization interval. If, on the other hand, the number of access terminals is less than a second threshold number, for example fifteen, the second data-synchronization interval might be selected so as to be shorter than the first. In at least one embodiment, the duration of the second data-synchronization interval is selected to be between 0.1 to 0.9 times, inclusive, the duration of the first data-synchronization interval.

Subsequent to selecting the second data-synchronization interval, the access terminal enforces the second data-synchronization interval. For example, the access terminal may receive an application-synchronization request from an application running on the access terminal in a first period having a duration substantially equal to the second data-synchronization interval, e.g., before an allowable next transmission point based on the second data-synchronization interval.

The access terminal may then enforce the second data-synchronization interval by delaying transmission of the application-synchronization request to the access point until at least the end of the first period, and in at least one embodiment will simply discard the application-synchronization request, e.g., never sending it to the network.

Alternatively or additionally, the access terminal may enforce the second data-synchronization interval by providing to the application that generated the application-synchronization request an "error" indication that falsely indicates that no wireless connection is currently available (i.e., the "error" indication is provided (e.g., sent) irrespective of the actual availability or unavailability of a connection to the network and/or the necessary communication device(s)).

In at least one embodiment, the access terminal may instruct one or more applications running on the access terminal to update their respective data-synchronization intervals to be no less in duration than the second data-synchronization interval. Applications that are synchronization-interval-configurable—and are accordingly configured to receive and execute such instructions—may then update their own data-synchronization-interval logic so that the access terminal is not required to further "enforce" the second data-synchronization interval.

In at least one embodiment, the access terminal may modify one or more of the first and second threshold values based at least in part on a rule, which (as examples), may be based on at least one of time and geographic location. For example, the first and second threshold values may be configured to be different during peak periods (e.g., by an offset, multiplier, divisor, etc. to their non-peak-period counterparts) of the day (week, month, year, etc.), and/or may be configured to be different (again perhaps using one or more of an offset, multiplier, divisor, etc.) in urban areas than they are in rural areas. And certainly many other possibilities exist as well. Alternatively or additionally, in at least one embodiment, the access terminal may modify one or more of the threshold values in response to receiving an instruction from the RAN, via the access point, to do so.

These as well as other aspects and advantages will become apparent to those of ordinary skill in the art by reading the following detailed description, with reference where appropriate to the accompanying drawings.

BRIEF DESCRIPTION OF THE DRAWINGS

Various example embodiments are described herein with reference to the drawings, in which.

DETAILED DESCRIPTION

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that aspects of the present disclosure, as generally described herein, and as generally illustrated in the Figures, can be arranged, substituted, combined, and designed in a wide variety of different configurations, all of which are contemplated.

a. Overview of an Example Network Architecture

Figure 1:
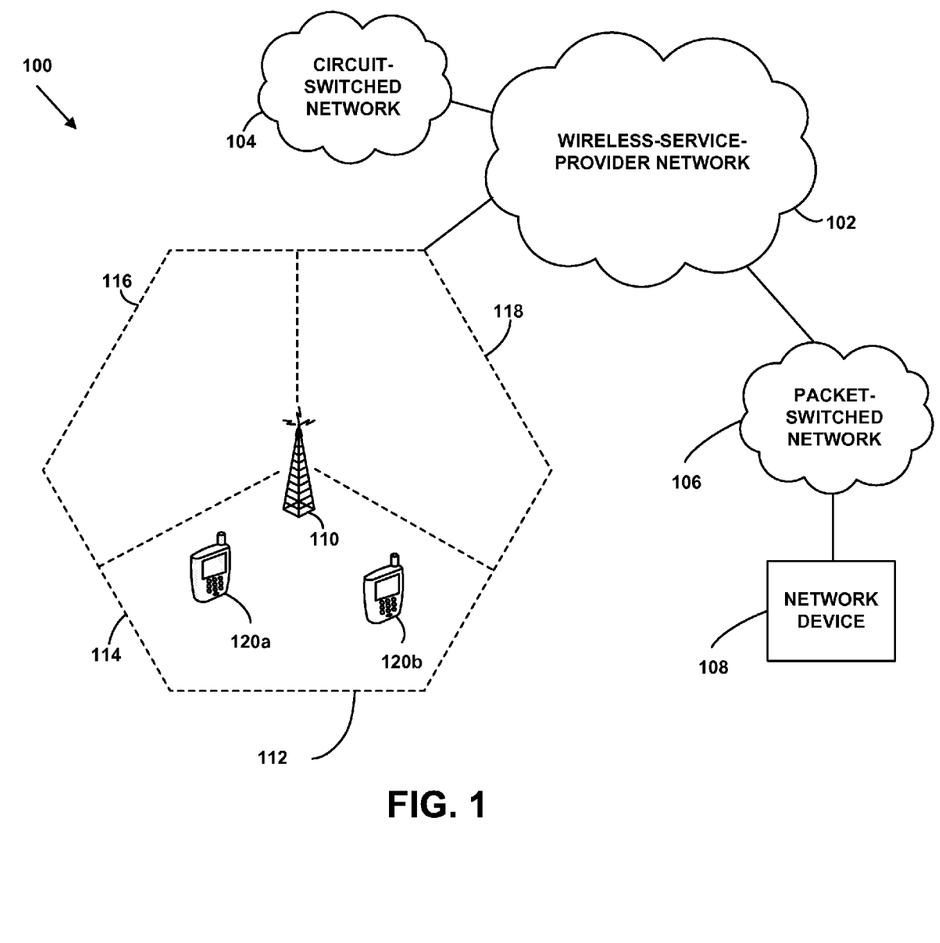
FIG. 1 is a simplified block diagram of a wireless communication system in accordance with at least one embodiment.

Referring to the drawings, FIG. 1 is a simplified block diagram of a communication system 100 in which at least one embodiment can be implemented. As shown, the system 100 includes a wireless-service-provider network 102, a circuit switched network 104 (e.g., the public switched telephone network (PSTN)), a packet-switched network 106 (e.g., the Internet), a network device 108 accessible via the network 106, a base transceiver station (BTS) 110, a coverage area 112 associated with BTS 110 and having service sector coverage areas 114-118, and access terminals 120a and 120b.

The wireless-service-provider network 102 may function to provide connectivity between an access terminal 120 such as a cell phone, personal digital assistant (PDA), or other wirelessly-equipped device, and one or more transport networks, such as the circuit-switched network 104 and the packet-switched network 106.

As shown, communications system 100 further includes a BTS 110. (Although FIG. 1 depicts the communications system 100 as including only one BTS, it should be understood that the communications system 100 may include more than one BTS). The BTS 110 may be any entity that facilitates communication between an access terminal 120 and the wireless-service-provider network 102. In this respect, the BTS 110 may function to transmit RF-radiation patterns at one or more carrier frequencies, and the RF-radiation patterns may then provide one or more air interfaces over which an access terminal 120 may communicate with the provider network 102. For example, the BTS 110 may transmit omni-directional RF-radiation patterns that provide a single air interface. Alternatively, the BTS 110 may transmit directional RF-radiation patterns that provide multiple air interfaces. For example, in FIG. 1, BTS 110 transmits RF-radiation in three directions to form a first coverage area sector 114, a second coverage area sector 116, and a third coverage area sector 118. The BTS 110 may provide one or more air interfaces in each of the sectors 114, 116, and 118.

Each of the one or more air interfaces of a given BTS 110, in a given sector, such as sector 114, may define a corresponding wireless coverage area. For example, if the first BTS 110 provides a single omni-directional air interface, then the BTS 110 may serve a single wireless coverage area (e.g., a cell). Alternatively, if the BTS 110 provides two air interfaces in each of sectors 114, 116, and 118, the BTS 110 may serve six wireless coverage areas.

The air interfaces of the BTS 110 may carry communications between the wireless-service-provider network 102 and an access terminal 120 according to any of a variety of protocols. For example, the air interfaces may carry communications according to CDMA (e.g., 1xRTT, IS-856), EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or other protocols now known or later developed. Depending on the protocol employed, the air interfaces may also be divided into a plurality of channels for carrying different types of communications between the wireless-service-provider network 102 and an access terminal 120. For example, each air interface may include forward-link channels (e.g., control channels, forward-traffic channels, etc.) for carrying forward-link communications from the wireless-service-provider network 102 to an access terminal 120, as well as reverse-link channels (e.g., access channels, reverse-traffic channels, etc.) for carrying reverse-link communications from an access terminal 120 to the wireless-service-provider network 102.

Although not shown in FIG. 1, the wireless-service-provider network 102 may include one or more radio network controllers (RNCs) (or base stations controllers (BSCs)), which may function to communicate with BTS 110 and control aspects of the BTS 110 (and perhaps other BTSs in the communication system 100) as well as aspects of the air-interface communication with the access terminals 120. For example, an RNC may control assignment of air-interface traffic channels to the access terminals 120. As another example, the RNC may control aspects of an access terminal's 120 switching between sectors and/or cells in the communication system 100. As yet another example, the RNC may facilitate communication between BTSs 110, such as communication between a first BTS 110 and a second BTS (not shown). Other examples are possible as well. Although not shown in FIG. 1, it should be noted that the RNC and one or more BTSs may be incorporated into a single entity.

The wireless-service-provider network 102 may also include a switch/gateway, such as a mobile switching center (MSC), which may provide connectivity with the circuit-switched network 104. Further, the wireless-service-provider network 102 may couple to a switch/gateway, such as a packet data serving node (PDSN), which may provide connectivity with the packet-switched network 106. In this respect, the wireless-service-provider network 102 may additionally include a packet control function (PCF) for controlling packet-data communications. Accordingly, with this general arrangement, the wireless-service-provider network 102 may facilitate communications between two access terminals 120 (e.g., 120a and 120b) in the wireless-service-provider network 102, as well as communications between a given access terminal 120 in wireless-service-provider network 102 and one or more network devices on the circuit-switched network 104 and/or the packet-switched network 106.

For example, access terminal 120a may be able to reach network device 108 via service-provider network 102 and packet-switched network 106. The network device 108 may maintain one or more applications, databases, or other resources accessible by one or more applications running on an access terminal 120. For example, an e-mail application running on access terminal 120a may periodically access an e-mail store on network device 108 in order to retrieve new e-mails associated with a user of access terminal 120a. Of course, access terminal 120a may access a network-connected device such as network device 108 to support any number of applications, including but not limited to calendars, web browsers, video-streaming clients, mapping programs, games, social-networking tools, weather programs, etc.

At any one time, an access terminal 120 may request and receive service from the wireless-service-provider network 102 in a single "serving" coverage area (and thus from a single serving BTS on a particular air interface), which an access terminal 120 selects from the service provider's plurality of coverage areas. To facilitate this selection process, an access terminal 120 may monitor signal conditions (e.g., carrier-to-interference (C/I) ratio and/or a signal-to-interference-plus-noise ratio (SINR)) for a plurality of coverage areas detected by the access terminal 120. The access terminal 120 will then typically select, request, and receive service in the coverage area with the best signal conditions (i.e., the "strongest" coverage area).

As part of the process of connecting to wireless-service-provider network 102 via BTS 110, or perhaps subsequent to this process, BTS 110 provides access terminals 120 active within its coverage areas with information indicative of a number of access terminals currently being served by BTS 110 via a forward link between BTS 110 and the access terminals 120. The information may include, among other possibilities, the actual number of access terminals currently being served in a coverage area (e.g., coverage area 114), or some other information indicative of the number of access terminals, such as the number of forward traffic channels currently in use in coverage area 114. Other indicators could be provided as well. In at least one embodiment, the information may comprise a QuickConfig message consistent with the EV-DO protocol. Other messages and other protocols could of course be used, instead or in addition.

b. Example Access Terminal Device Structure

Figure 2:
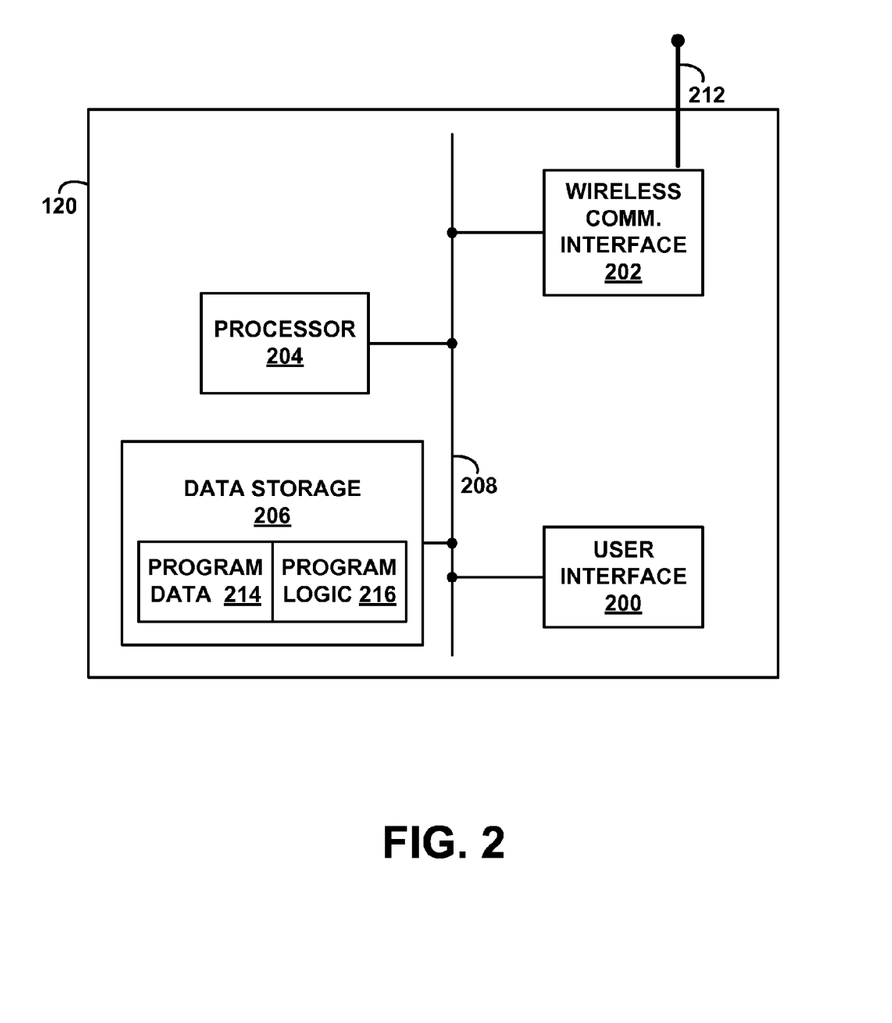
FIG. 2 is a block diagram of an access terminal for operating in the wireless communication system of FIG. 1.

FIG. 2 is a simplified block diagram showing functional components of an exemplary access terminal 120 capable of carrying out the access terminal functions described herein. As shown in FIG. 2, access terminal 120 may include a user interface 200, a wireless communication interface 202, a processor 204, and data storage 206, all linked together via a system bus, network, or other connection mechanism 208. An internal or external antenna 212 may be provided to aid in wireless communications with another device.

The user interface 200 preferably functions to facilitate user interaction with the exemplary access terminal 120, and may include a variety of input components such as a touch screen, a navigation pad, a multi-functional button, a thumb wheel, a keyboard or keypad, and/or a microphone. Additionally, the user interface 200 may include a variety of output components such as a display screen and/or a speaker. The user interface 200 may also include signal processing components, such as A-D and D-A circuitry and/or other components for facilitating user interaction with the exemplary access terminal 104.

The communication interface 202 may function to communicatively and bi-directionally couple the exemplary access terminal 120 to the wireless-service-provider network 102, and more particularly to the BTS 110, and may include a chipset adapted to facilitate wireless communication according to a desired protocol (e.g., IS-856, EVDO, WiMax) and/or any other form of wireless communication. The communication interface 202 may also include multiple communication interfaces, such as one with which the access terminal 120 sends reverse-link communications and one with which the access terminal 120 receives forward-link communications. Other configurations are also possible.

The processor 204 may comprise one or more general purpose microprocessors and/or dedicated signal processors. (The term "processor" encompasses either a single processor or multiple processors that could work in combination.) Data storage 206, in turn, may comprise memory and/or other storage components, such as optical, magnetic, organic or other memory or disk/disc storage, which can be volatile and/or non-volatile, internal and/or external, and integrated in whole or in part with the processor 204. Data storage 206 may contain or may be arranged to contain (i) program data 214 and (ii) program logic 216. Although these components are described herein as separate data storage elements, the elements could just as well be physically integrated together or distributed in various other ways. In one example, the program data 214 would be maintained in data storage 206 separate from the program logic 216, for easy updating and reference by the program logic 216.

Program data 214 may contain, for example, information related to the BTS 110 and the current coverage area 114 including, for example, an indication of a cell (or sector) in which the access terminal 120 is currently operating. Program data 214 may also contain information related to the sectors and/or cells in which the access terminal 120 has previously requested data. As yet another example, program data 214 may contain first and second threshold values associated with information received from BTS 110 indicative of a number of access terminals currently being served by BTS 110 in the current coverage area. The threshold values may be, for example, related to respective numbers of access terminals being served in the current coverage area that would cause the access terminal 120 to increase, or maintain, or decrease, etc. a data-synchronization interval, and may be in terms of access terminals being served, valid forward traffic channels, and/or one or more other metrics. For the purposes of the remainder of this description, it is assumed, solely for ease of description, that the threshold value indicates a number of access terminals being served.

The threshold values could be stored in static, non-volatile read-only memory, or could be updatable by a user or by the wireless-service-provider network 102. The threshold values could, of course, be stored separate from the program data 214 and program logic 216. The first threshold value may correspond to a maximum number of access terminals being served in the access terminal's 120 current coverage area 114, above which the access terminal 120 takes steps (i.e., a first-threshold response) to reduce its data-synchronization interval, thereby placing a lighter load on the BTS 110. As an example, the first threshold may have a numerical value in the range of 15-25.

The second threshold value may correspond to a minimum number of access terminals being served in the access terminal's 120 current coverage area 114, below which the access terminal 120 takes steps (i.e., a second-threshold response) to increase its data-synchronization interval, thereby placing a heavier load on the BTS 110. As an example, the second threshold may have a numerical value in the range of 10-20.

Program logic 216 may comprise machine-language instructions that may be executed and/or interpreted by processor 204 to carry out functions described herein. Additionally, program logic 216 may comprise machine-language instructions for executing an operating system on access terminal 120, which may take care of initiating and managing voice calls and data transfers with other wireless devices, including BTS 110.

Program logic 216 may further comprise machine-language instructions for executing one or more applications such as e-mail clients, calendars, web browsers, video-streaming clients, mapping programs, games, social-networking tools, weather programs, etc. Each of these applications may have an associated data-synchronization interval set within the application's program code, set by the access terminal 120, set by the service-provider network 102, and/or set by some other source.

Taking the e-mail application as an example, e-mail already retrieved by the e-mail application and associated with a user of the application terminal 120 may be stored in program data store 214. According to an e-mail synchronization interval associated with the e-mail application, the e-mail application may generate data-synchronization requests, and transmit the requests via the wireless communications interface 202, BTS 110, wireless-service-provider network 102, and packet-switched network 106 to network device 108, which may be executing a remote e-mail server application program. Each e-mail data-synchronization request may request that all new e-mails received at network device 108 and addressed to the user associated with the access terminal 120, perhaps relative to a prior e-mail data-synchronization request. New e-mail data responsively transmitted from the network device 108 to the access terminal 120 may then be stored in program data store 214. The new e-mails may be immediately displayed on a display screen of the access terminal 120 via user interface 200, or perhaps a notification displayed on the display screen indicating that new e-mails are available at access terminal 120. As an example, the e-mail data synchronization interval may be between one and five minutes. Other applications may work in a similar manner, but may have different associated data-synchronization intervals, and may generate varying levels of network traffic responsive to respective data-synchronization requests.

Each of the applications may include machine-language instructions to make them "data-synchronization configurable." In other words, each of the applications may be capable of varying an associated data-synchronization interval in response to an instruction from the access terminal 120, the BTS 110, the wireless-service-provider network 102, and/or some other entity. For example, a data-synchronization configurable e-mail application may initially be set to transmit a data-synchronization request to network device 108 every 2 minutes. However, and perhaps in response to receiving an instruction to increase the e-mail data-synchronization interval from access terminal 120, the e-mail application may increase the associated e-mail data synchronization interval so as to generate e-mail data-synchronization requests every 4 minutes instead of every 2 minutes. Advantageously, doing so effectively reduces network resource consumption associated with the e-mail application by half. The new e-mail data-synchronization interval may be stored in program data store 214 and used in all future e-mail data-synchronization requests, or may be stored in volatile memory and lost once the access terminal is powered down. In the latter case, and upon restarting, the e-mail data-synchronization interval may reset to its default value.

Of course, the data-synchronization intervals noted above are examples, and other data-synchronization intervals and varying degrees of changes to the data-synchronization intervals, could be used. And note that "non-data-synchronization configurable" applications may rely on (or be subject to) operating-system code enforcing changes to data-synchronization intervals by, for example, rejecting or dropping respective data-synchronization requests that do not meet the new data-synchronization interval requirements, or perhaps sending false error messages in response to receiving such data-synchronization requests. Of course, in the event that data-synchronization-configurable applications intentionally or inadvertently generate data-synchronization requests that do not meet the new data-synchronization interval requirements, operating-system code may similarly enforce changes to data-synchronization intervals, even against purportedly data-synchronization configurable applications.

It should be understood that the program logic 216 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware, or any combination thereof. When embodied in software, the software may be stored on any computer-readable medium for use by, or in connection with, any computer-related system or method. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions, such as an access terminal and/or wireless communication device.

c. Exemplary Operation

Figure 3A:
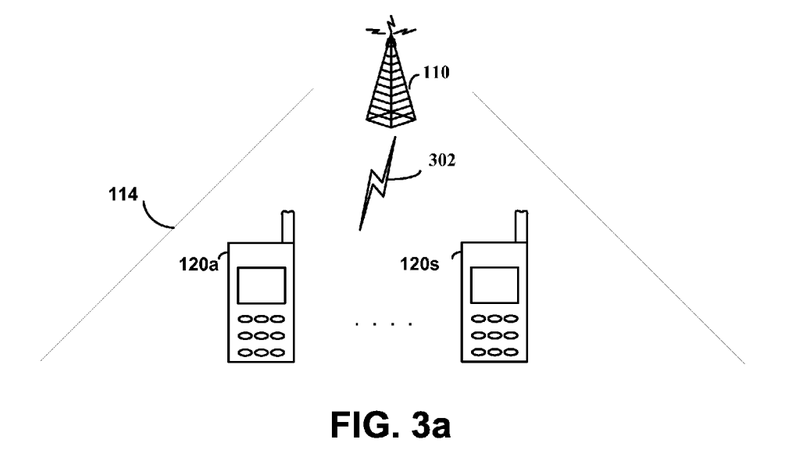
FIGS. 3a and 3b illustrate a change (in a number of access terminals operating in a sector) that may trigger a determination of a new data-synchronization interval in the access terminal of FIG. 2.
Figure 3B:
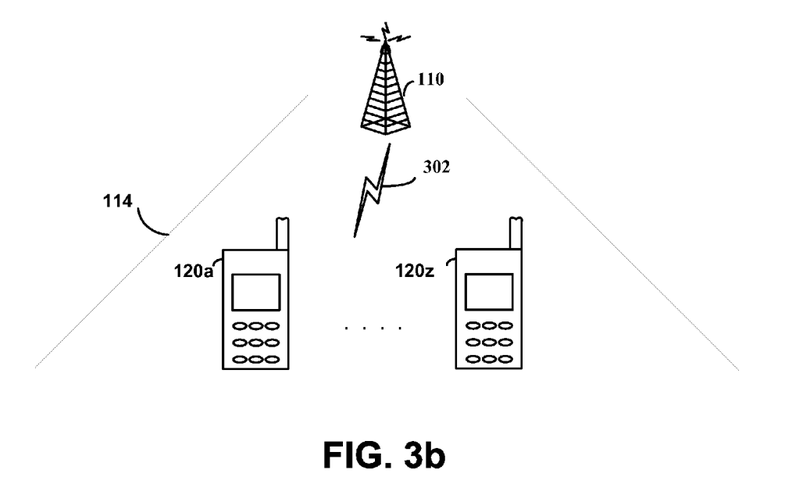

FIGS. 3*a* and 3*b* illustrate at least one embodiment in which nineteen access terminals, 120*a*-120*s*, are operating in coverage area 114 of BTS 110. While access terminals 120*a*-120*s* are operating in the coverage area 114, BTS 110 may provide the access terminals 120*a*-120*s* with an indication of the number of access terminals operating in the coverage area 114. The indication may be provided to the access terminals 120*a*-120*s* via a forward-link of wireless air interface 302. For example, in FIG. 3(*a*), the indication may comprise a message indicating that nineteen terminals (terminals 120*a*-120*s*) are currently operating in coverage area 114.

In at least one example, the message may be a QuickConfig message containing a "forward traffic channel valid" field indicating that nineteen unique media access control (MAC) ID's, each associated with a particular access terminal 120*a*-120*s*, are currently receiving service form BTS 110. The message may be broadcast to all access terminals operating in coverage area 114, multi-cast to all known access terminals operating in coverage area 114, or unicast via a plurality of messages to each known access terminal operating in coverage area 114. In general, any suitable approach by which the network conveys this information to at least one access terminal may be used.

FIG. 3*b* illustrates the addition of access terminals 120*t*-120*z* to the coverage area 114. Access terminals 120*t*-120*z* may have roamed into coverage area 114 and handed-off service to BTS 110, for example, or may have powered-on and requested service from BTS 110 while in coverage area 114. For the purposes of this example, it is assumed that access terminal 120*a* is programmed with a first threshold value of 25, and a second threshold value of 20. As set forth earlier, when access terminal 120*a* detects that the number of terminals operating in the current coverage area 114 exceeds the first threshold value, access terminal 120*a* executes a first-threshold response, including increasing a data-synchronization interval of at least one application. After detecting an exceeding of the first threshold, access terminal 120*a* may wait until the number of access terminals operating in current coverage area 114 falls below the second threshold value before decreasing its data-synchronization interval.

Thus, at some point in time after that last access terminal 120*z* in FIG. 3*b* begins receiving service from BTS 110 in coverage area 114, BTS 110 may transmit a message to access terminal 120*a* (perhaps among others) indicating that 26 access terminals are active in the access terminal's 120*a* current coverage area 114. Responsive to receiving this indication, and in order to reduce a traffic load on BTS 110, among other reasons, access terminal 120*a* executes a first-threshold response, which may include any one or ways of increasing a data-synchronization interval of one or more applications executing on access terminal 120*a*, as discussed herein. Of course, any decrease in network traffic load may be made at some expense to a user experience of a user of the access terminal 120*a*.

The increased data-synchronization interval may be imposed across-the-board on all applications executing on access terminal 120*a*, or on individual applications executing on access terminal 120*a*. In one aspect, the increased data-synchronization interval may be imposed on applications via an increased minimum floor value (e.g., no application is allowed a data-synchronization interval less than 3 minutes), or may be imposed via a relative-value increase. In the latter case, all data-synchronization intervals may be increased by, for example, 100%, perhaps causing an e-mail data-synchronization interval to increase from 4 minutes to 8 minutes, while causing a social-networking client data-synchronization interval to increase from 1 minute to 2 minutes, and so on. Of course, other relative increase parameters could be used, preferably falling within the range of 125% to 350% of the respective initial value.

Figure 4A:
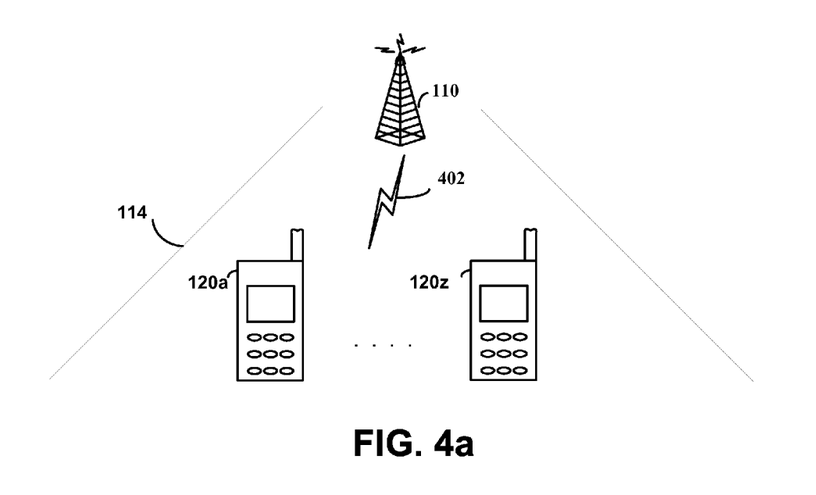
FIGS. 4a and 4b illustrate another change (in a number of access terminals operating in a sector) that may trigger a determination of a new data-synchronization interval in the access terminal of FIG. 2.
Figure 4B:
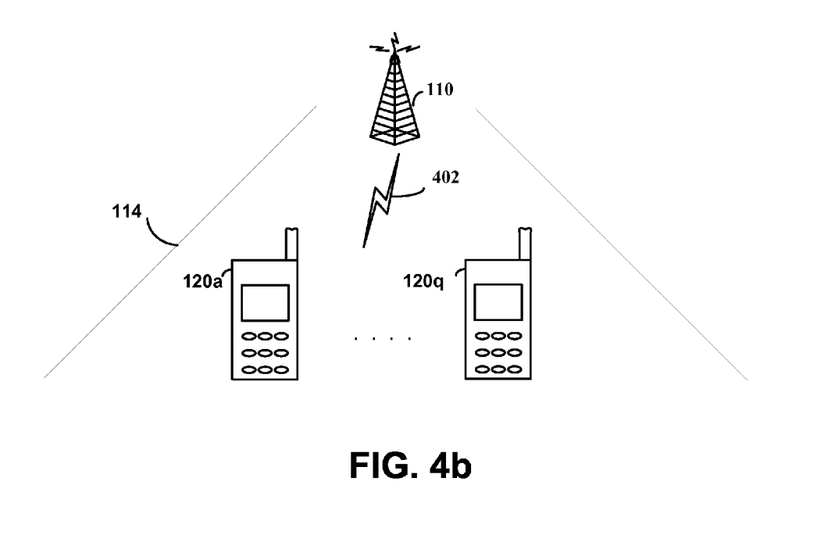

In some ways, FIGS. 4*a* and 4*b* illustrate the reverse of FIGS. 3*a* and 3*b*. In FIG. 4*a*, 26 access terminals (120*a*-120*z*) are initially active in coverage area 114. As shown in FIG. 4*b*, access terminals 120*r*-120*z* leave the coverage area 114, perhaps because they have handed-off service to a different coverage area, have powered down, or for some other reason. As set forth earlier, it is assumed for the purpose of example only that access terminal 120*a* is programmed with a second threshold value of 20. At some point after access terminals 120*r*-120*z* have left coverage area 114, BTS 110 transmits a message to access terminal 120*a* indicating that 17 access terminals are active in the access terminal's 120*a* current coverage area 114.

Subsequent to receiving this indication, and in order to improve a user experience of a user of the access terminal 120*a*, among other reasons, access terminal 120*a* executes a second-threshold response. The second-threshold response may include any one or more methods for decreasing a data-synchronization interval of one or more applications executing on access terminal 120*a*, as discussed herein. By decreasing a data-synchronization interval associated with one or more applications executing on access terminal 120*a*, a network traffic load on BTS 110 is increased, but a user experience at the access terminal 120*a* may be improved due to an increased responsiveness to data-synchronization requests.

The decreased data-synchronization interval may be imposed across-the-board to all applications executing on access terminal 120a, or only on particular individual applications executing on access terminal 120a (e.g., perhaps only those applications that had their data-synchronization interval increased responsive to the first-threshold response). In one aspect, the decreased data-synchronization interval may be imposed on applications via a decreased minimum floor value (e.g., no application is allowed a data-synchronization interval less than 1 minute), or may be imposed via a relative-value decrease. In the latter case, all data-synchronization intervals may be decreased by, for example, 50%, causing an e-mail data-synchronization interval to decrease from 8 minutes to 4 minutes, while causing a social-networking client data-synchronization interval to decrease from 2 minutes to 1 minute, and so on. Of course, other relative increase parameters could be used, preferably falling within the range of 10% to 90% of the respective initial value.

Figure 5:
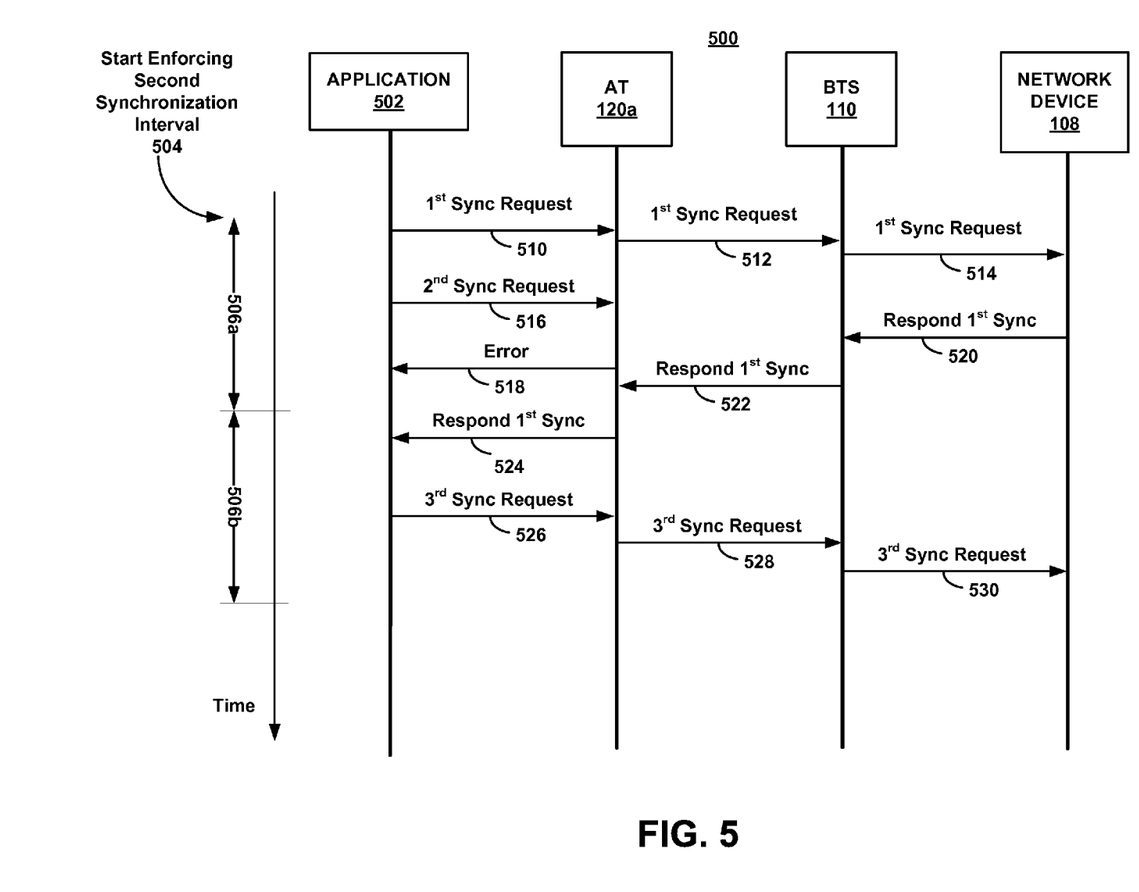
FIG. 5 is a timing diagram in accordance with at least one embodiment in which an access terminal returns a false error message to an application not complying with a new data-synchronization interval.
Figure 6:
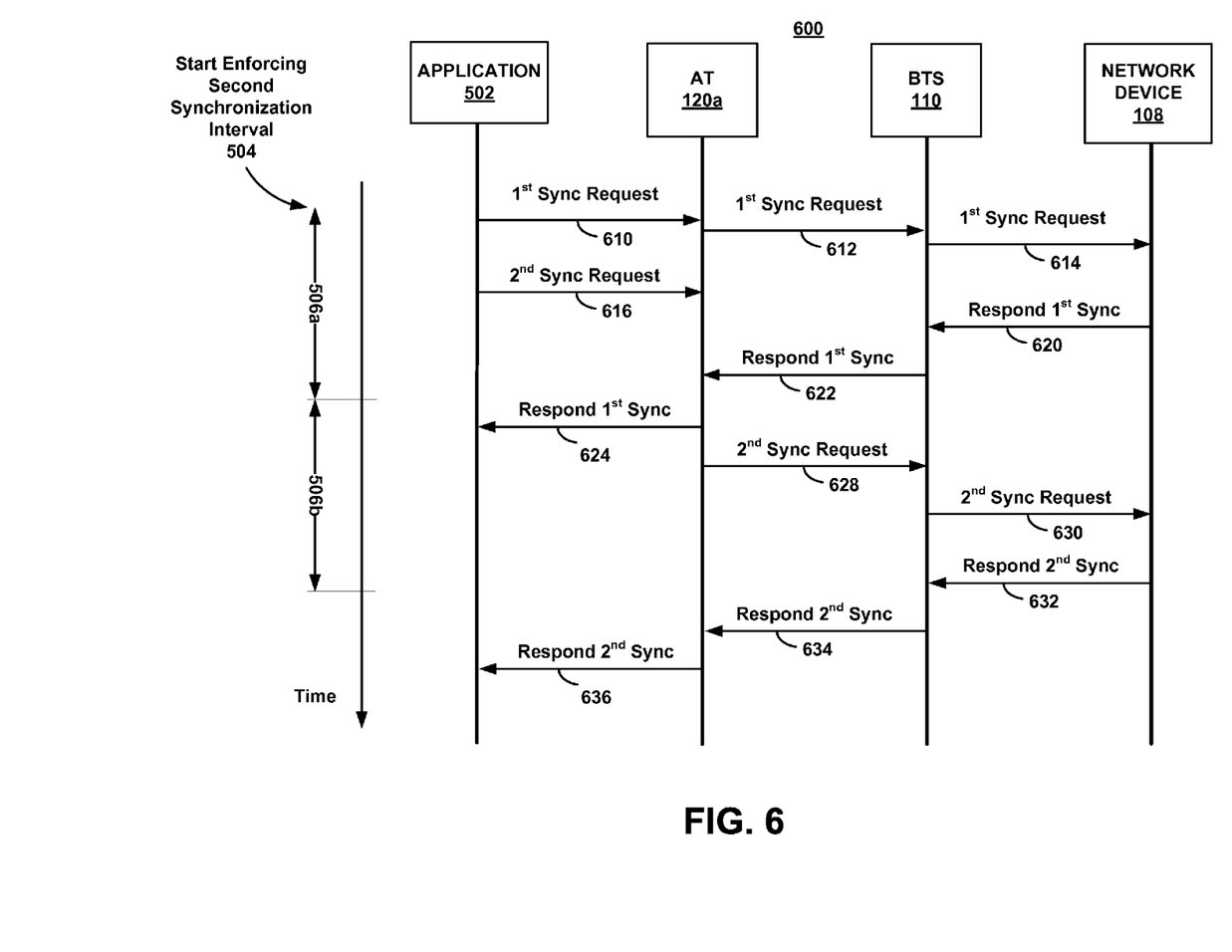
FIG. 6 is a timing diagram in accordance with at least one embodiment in which an access terminal delays a synchronization request from an application that does not comply with a new data-synchronization interval.
Figure 7:
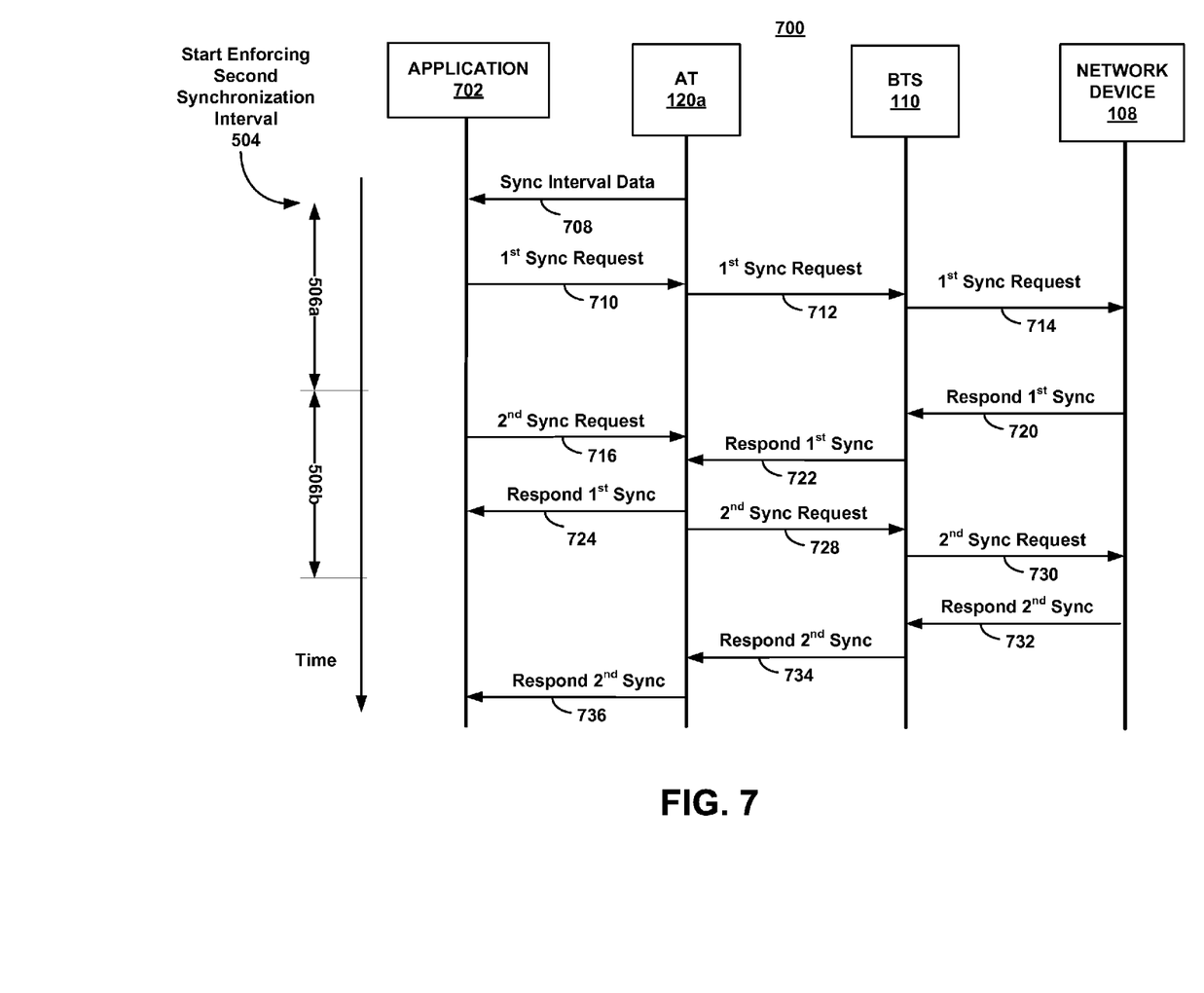
FIG. 7 is a timing diagram in accordance with at least one embodiment in which a synchronization-configurable application varies its data-synchronization interval responsive to an instruction from an access terminal.

In various embodiments, access terminal 120 executing a first and/or second threshold response may comprise any suitable approach for enforcing correspondingly altered data-synchronization intervals. FIGS. 5-7 illustrate several possible enforcement techniques. Although each figure sets forth one example embodiment, neither these methods nor the set thereof are intended to be exclusive; for example, a first and/or second threshold response may include two or more of the example methods set forth in FIGS. 5-7. Furthermore, although the ensuing discussion focuses on the first threshold response and corresponding increase in a data-synchronization interval from a first period of time to a second longer period, one of ordinary skill would recognize that the second threshold response would include similar considerations and steps, but comprise an opposite change in data-synchronization-interval length.

FIG. 5 is a timing diagram illustrating a message flow 500 for an embodiment in which access terminal 120a returns a false error message to an application not complying with a second data-synchronization interval. For the purposes of illustration, it is assumed in FIG. 5 that access terminal 120a has already received a message from BTS 110 indicating a number (of active access terminals in coverage area 114) that exceeds the access terminal's 120a first threshold, causing access terminal 120a to execute a first-threshold response (e.g., the state of coverage area 114 proceeds from that illustrated in FIG. 3a to that in FIG. 3b).

Application 502 may be, for example, a non-data-synchronization-configurable e-mail application having a pre-first-threshold-response data-synchronization interval of 4 minutes. FIG. 5 illustrates application 502 beginning to enforce the second synchronization interval 504, and further illustrates periods 506a and 506b commensurate with the second synchronization interval 504 (e.g., each period 506a and 506b complying with the second synchronization interval and are, for example, 8 minutes long). Of course, these values are exemplary in nature only, and are not meant to limit actual values that may be used in practice.

As set forth in FIG. 5, application 502 generates a first data-synchronization request 510 shortly after the beginning of the first period 506a complying with the second synchronization interval 504. The first data-synchronization request 510 may be, for example, a request for any new e-mail stored at network device 108 and associated with a user of access terminal 120a. Because application 502 is allowed one data-synchronization request per period 506 in accordance with the second synchronization interval 504, and data-synchronization request 510 is the first one in period 506a, access terminal 120a (e.g., an operating-system executing on processor 204 of access terminal 120a) forwards the first data-synchronization request as a request packet 512 to BTS 110 via wireless communication interface 202 and a reverse-link channel established between BTS 110 and access terminal 120a. BTS 110, upon receipt, forwards the request in request packet 514 to network device 108 via wireless-service-provider network 102 and packet-switched network 106.

Responsive to receiving the first data-synchronization request 514, the remote e-mail application running on network device 108 retrieves any new data responsive to the request (e.g., any new e-mails associated with a user of access terminal 120a), generates a response packet 520, and forwards the response packet to BTS 110 via packet-switched network 106 and wireless-service-provider network 102. The response is then forwarded to access terminal 120a via packet 522, and finally to application 502 via message 524. Access terminal 120a may then display any newly-received e-mails on a display screen via user interface 200, or perhaps provide a notification on the display screen indicating that new e-mails are now available.

As shown in FIG. 5, non-data-synchronization-configurable application 502 generates a second data-synchronization request 516 that does not comply with the longer period 506a corresponding to the second synchronization interval 504. In response to receiving the second data-synchronization request 516 within the same period 506a as the first data-synchronization request 510, access terminal 120a responds with an error message 518 to application 502. The error message 508 may be any message that could be interpreted by application 502 as a failure of the second data-synchronization request 516.

In at least one embodiment, the error message 508 may indicate that no network connection with the wireless-service-provider network 102 is currently available over which to transmit the second data-synchronization request 516, regardless of the actually availability of a network connection. One possible advantage of indicating a lack of connectivity, as opposed to a failure of the request packet itself to reach network device 108, is that it may not result in an immediate retry of the second data-synchronization request 516 by the application 502; also, the application incorrectly noting an error condition to the user can be avoided. Although not shown in FIG. 5, any additional data-synchronization requests received in period 506a may be similarly responded to with an error message, may be dropped, or may be buffered in a manner that will be discussed in more detail with respect to FIG. 6 below.

In at least one embodiment, and as illustrated in FIG. 5, application 502 may increase its own data-synchronization interval during the second period 506b in light of the error indication 518 received during the first period 506a. For example, application 502 may only generate a single third data-synchronization request 526, which is forwarded via request packets 528 and 530 to network device 108. As such, application 502 does not generate a fourth data-synchronization request in period 506b, but instead may delay it until a subsequent period. In another embodiment, although not illustrated in FIG. 5, the application 502 may not make any changes to its behavior in period 506b, such that the packet flow in period 506b mimics the packet flow in period 506a, with a corresponding second error message transmitted from access terminal 120a to application 502 in the second period 506b.

Although FIG. 5 illustrates an embodiment in which access terminal 120a enforces the second synchronization interval 504 by only allowing one synchronization request per period (e.g., 506a and 506b), other methods of enforcing the second synchronization interval 504 could alternatively be used. For example, access terminal 120a may implement timers per application that enforce the second synchronization interval 504. Using timers for each application would prevent a situation in FIG. 5 where application 502 generates a first data-synchronization request near the end of period 506a, and a second data-synchronization request at the beginning of period 506b. While the embodiment disclosed in FIG. 5 would allow such requests, an application-specific timer would reject the second data-synchronization request if it is generated less than the second synchronization interval period (e.g., 8 minutes) after the first.

Returning to the example embodiment of FIG. 5, once access terminal 120a receives an indication from BTS 110 that the number of access terminals operating in coverage area 114 has fallen below the second threshold (e.g., the state of coverage area 114 proceeds from that illustrated in FIG. 4a to that in FIG. 4b), and as part of access terminal 120a executing the second-threshold response, access terminal 120a may reduce the length of each period 506, perhaps back to a first synchronization interval used prior to the second synchronization interval 504, and may therefore receive a second data-synchronization request (like 516 in FIG. 5) in a different period than that during which the access terminal 120a received the previous (i.e., first like 510 in FIG. 5) request, and responsively serve the request rather than responding with a false error message.

FIG. 6 is a timing diagram illustrating a message flow 600 for an embodiment in which access terminal 120a delays a (e.g., second-in-the-period) synchronization request from an application not complying with the second data-synchronization interval 504. Again, and for the purposes of illustration, it is assumed in FIG. 6 that access terminal 120a has already received a message from BTS 110 indicating a number—of active access terminals in coverage area 114—that exceeds the access terminal's 120a first threshold, causing access terminal 120a to execute a first-threshold response (e.g., the state of coverage area 114 proceeds from that of FIG. 3a to that of FIG. 3b), and application 502 subsequently begins enforcing the second synchronization interval 504 via longer periods 506a and 506b.

As set forth in FIG. 6, application 502 generates a first data-synchronization request 610 shortly after the beginning of the first period 506a, associated with the second synchronization interval 504. As above, the first data-synchronization request 610 may be, for example, a request for any new e-mail stored at network device 108 and associated with a user of access terminal 120a. Because application 502 is allowed one data-synchronization request per period 506, and data-synchronization request 610 is the first one in period 506a, access terminal 120a forwards the first data-synchronization request as request packet 612 to BTS 110 via wireless communication interface 202 and a reverse-link channel established between BTS 110 and access terminal 120a. BTS 110, upon receipt, forwards the request in request packet 614 to network device 108 via wireless-service-provider network 102 and packet-switched network 106.

Responsive to receiving the first data-synchronization request 614, network device 108 retrieves any new data responsive to the request (e.g., any new e-mails associated with a user of access terminal 120a), generates a response packet 620, and forwards the response packet 620 to BTS 110. The response is then forwarded to access terminal 120a via packet 622, and finally to application 502 via message 624. Access terminal 120a may then display any newly-received e-mails on a display screen via user interface 200, or perhaps provide a notification on the display screen indicating that new e-mails are now available.

As shown in FIG. 6, non-data-synchronization-configurable application 502 generates a second data-synchronization request 616 that does not comply with the longer period 506a compliant with the second synchronization interval 504. In response to receiving the second data-synchronization request 616 within the same period 506a as the first data-synchronization request 610, access terminal 120a refrains from forwarding the second data-synchronization request 616 to BTS 110 for a period of time, and instead buffers the packet until a next period 506b. Although not depicted in FIG. 6, any additional data-synchronization requests received in period 506a may be similarly buffered, may be dropped, or may be responded to with an error message such as that disclosed with respect to FIG. 5 above. One possible advantage of buffering, as opposed to sending a false error message, is that may prevent a potential loss of data and/or prevent the application 502 from generating an exception.

In at least one embodiment, and responsive to the beginning of a subsequent period 506b compliant with the second synchronization interval 504, access terminal retrieves the buffered second data-synchronization request 616, and transmits the request to BTS 110 via request packet 628. In the event that access terminal 120 received and buffered more than one extra data-synchronization request during period 506a, it may transmit all of the buffered requests in one single transmission during the second period 506b, or may transmit only one and drop the rest. Responsive to receiving the request packet 628, BTS 110 then forwards the request to network device 108 via request packet 630. Network device 108 then retrieves any new data responsive to the request, generates a second response packet 632, and forwards the second response packet 632 to BTS 110. The response is then forwarded to access terminal 120a via packet 634, and finally to application 502 via message 636. Access terminal 120a may then display any newly-received e-mails on a display screen via user interface 200, or perhaps provide a notification on the display screen indicating that new e-mails are now available, or some other alert, or perhaps no alert at all, etc.

Similar to the discussions above with regard to FIG. 5, application-specific timers could similarly be used in the example embodiment of FIG. 6. In such a case, for example, the second data-synchronization request 616 generated by application 502 may be buffered for a length of time substantially equal to the second synchronization interval (e.g., 8 minutes), instead of simply waiting for a next period 506b compliant with the second synchronization interval 504 to begin. Furthermore, and similar to the discussions above with regard to FIG. 5, access terminal 120a may, perhaps at some time subsequent to that illustrated in FIG. 6, execute a second-threshold response and reduce the length of each period 506, perhaps avoiding any need to buffer subsequent data-synchronization requests.

FIG. 7 is a timing diagram illustrating a message flow 700 for an embodiment in which access terminal 120a is executing a synchronization-configurable application 702 that is configured to vary its own data-synchronization interval responsive to a received instruction from access terminal 120, BTS 110, wireless-service-provider 102, and/or some other network entity. Again, and for the purposes of illustration, it is assumed in FIG. 7 that access terminal 120a has already received a message from BTS 110 indicating a number—of active access terminals in coverage area 114—that exceeds the access terminal's 120a first threshold, causing access terminal 120a to carry out a first-threshold response (e.g., the state of coverage area 114 proceeds from that of FIG. 3a to that of FIG. 3b).

In this case, however, and as set forth in FIG. 7, as part of the first-threshold response, or perhaps subsequent to the first-threshold response, access terminal 120a transmits a data-synchronization-interval message 708 to application 702, providing it with the information indicative of the new second synchronization interval 504. As set forth above, this information could be a higher minimum floor value for the application 702 to set as a minimum data-synchronization interval, or could be a percent increase that application 702 should apply to its own data-synchronization interval.

For the purposes of illustration, it is assumed that application 702, absent receiving the data-synchronization-interval message 708, would have generated first and second synchronization requests within the first period 506a similar to that illustrated in FIG. 6. However, and in response to receiving the data-synchronization interval data 708, application 702 modifies its own internal data-synchronization interval such that, as shown in FIG. 7, first data-synchronization request 710 is generated in the first period 506a after access terminal 120a begins enforcing the second synchronization interval 504, and second data-synchronization request 716 is generated in the subsequent second period 506b. As a result, the access terminal 120a does not need to enforce the second synchronization interval 504 (e.g., in the manner set forth in FIG. 5 or FIG. 6). Of course, in at least one embodiment, access terminal 120a may still enforce the second synchronization interval 504 to prevent rogue applications for ignoring the data-synchronization-interval message 708.

The first and second data-synchronization requests 710, 716 may be, for example, requests for any new e-mail stored at network device 108 and associated with a user of access terminal 120a. Because application 702 is allowed one data-synchronization request per period 506, and data-synchronization requests 710, 716 are generated in respective periods 506a and 506b, access terminal 120a forwards the first and second data-synchronization requests as respective request packets 712 and 728 to BTS 110. BTS 110, upon receipt, forwards the requests in respective request packets 714 and 730 to network device 108 via wireless-service-provider network 102 and packet-switched network 106.

Responsive to receiving the respective first and second data-synchronization requests 714, 730, network device 108 retrieves any new data responsive to the request (new e-mails associated with a user of access terminal 120a in this example), generates respective response packets 720, 732, and forwards the response packet to BTS 110. The response is then forwarded to access terminal 120a via respective packets 722, 734 and finally to application 702 via respective messages 724, 736. Access terminal 120a may then display any newly received e-mails on a display screen via user interface 200, or perhaps provide a notification on the display screen indicating that new e-mails are now available, among other actions.

Similar to the discussions above with regard to FIGS. 5 and 6, application-specific timers could similarly be used in the example embodiment of FIG. 7. In such a case, for example, the second data-synchronization request 716 generated by application 702 may be not be generated for a length of time substantially equal to the second synchronization interval (e.g., 8 minutes), instead of simply waiting for a next period 506b compliant with the second synchronization interval 504 to begin. Furthermore, and similar to the discussions above with regard to FIGS. 5 and 6, access terminal 120a may, perhaps at some time subsequent to that illustrated in FIG. 7, execute a second-threshold response and may transmit a second data-synchronization-interval data message informing the application 702 of a decrease in the data-synchronization interval. As set forth above, the decrease may be a lower minimum floor value for the application 702 to set as a minimum data-synchronization interval, or could be a percent decrease that application 702 could then apply to its own data-synchronization interval.

As noted earlier, the approaches reflected in FIGS. 5-7 are not intended to be exclusive, and a first and/or second threshold response may involve aspects of two or more of these approaches. For example, an access terminal 120b may be, at various times, executing both data-synchronization-configurable applications and non-data-synchronization-configurable applications.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for modifying a data-synchronization interval used in operation by an access terminal, the method comprising:

an access terminal, operating in a coverage area of a wireless access point, periodically polling at least one network device via the access point for synchronization data according to a first data-synchronization interval, wherein synchronization data comprises data selected from the group consisting of new data and updated data;

the access terminal receiving from the access point information indicative of a number of access terminals being served by the access point in the coverage area;

subsequent to receiving the information, the access terminal making an interval-modification determination comprising a determination of a second data-synchronization interval based at least in part on a comparison of the number to a threshold value, the second data-synchronization interval being different in duration than the first; and subsequent to determining the second data-synchronization interval, the access terminal periodically polling the at least one network device for synchronization data according to the second data-synchronization interval.

2. The method of claim 1, wherein the interval-modification determination further comprises a determination that the number is greater than the threshold value, and wherein the second data-synchronization interval is accordingly responsively chosen to be longer than the first data-synchronization interval.

3. The method of claim 2, wherein the threshold value is within the range of 20-25 access terminals.

4. The method of claim 2, wherein the second data-synchronization interval is 1.25 to 3.5 times, inclusive, longer than the first data-synchronization interval.

5. The method of claim 1, wherein the interval-modification determination further comprises a determination that the number is less than the threshold value, and wherein the second data-synchronization interval is accordingly responsively chosen to be shorter than the first data-synchronization interval.

6. The method of claim 5, wherein the threshold value is within the range of 15-20 access terminals.

7. The method of claim 5, wherein the second data-synchronization interval is 0.1 to 0.9 times, inclusive, shorter than the first data-synchronization interval.

8. The method of claim 1, further comprising, while the access terminal is periodically polling according to the second data-synchronization interval, the access terminal receiving during a given data-synchronization period an application-synchronization request from an application running on the access terminal, the given data-synchronization period being substantially equal in duration to the second data-synchronization interval, and responsively enforcing the second data-synchronization interval at least in part by not transmitting the application-synchronization request to the access point during the given data-synchronization period.

9. The method of claim 1, further comprising, while the access terminal is periodically polling according to the second data-synchronization interval, the access terminal receiving during a given data-synchronization period an application-synchronization request from an application running on the access terminal, the given data-synchronization period being substantially equal in duration to the second data-synchronization interval, and responsively enforcing the second data-synchronization interval at least in part by, irrespective of whether or not a connection is actually currently available, providing to the application an indication that no connection is currently available.

10. The method of claim 1, wherein the information indicates a number of forward traffic channels in use within the coverage area.

11. The method of claim 10, wherein the information is transmitted to the access terminal in a QuickConfig message.

12. The method of claim 1, wherein the coverage area is a sector within a larger area over which the access point provides wireless service.

13. The method of claim 1, further comprising the access terminal choosing the threshold value based at least in part on a rule.

14. The method of claim 13, wherein the rule is based on at least one factor selected from the group consisting of time and geographic location.

15. The method of claim 1, further comprising the access terminal choosing the threshold value based at least in part on an instruction received from the access point.

16. The method of claim 1, wherein one or more applications that each have a respective data-synchronization interval are running on the access terminal, the method further comprising instructing at least one such application to set its respective data-synchronization interval to be no shorter than the second data-synchronization interval.

17. The method of claim 1, wherein one or more applications that each have a respective data-synchronization interval are running on the access terminal, and wherein periodically polling the at least one network device for synchronization data according to the second data-synchronization interval comprises maintaining one or more respective application-specific timers that enforce the second data-synchronization interval on a per-application basis.

18. The method of claim 1, wherein one or more applications that each have a respective data-synchronization interval are running on the access terminal, and wherein periodically polling the at least one network device for synchronization data according to the second data-synchronization interval comprises allowing each respective application to transmit only one data-synchronization request in each of a plurality of subsequent time periods consistent with the second data-synchronization interval.

19. An access terminal, operating in a coverage area of a wireless access point, comprising:
  a communication interface;
  a processor; and
  data storage containing instructions executable by the processor for causing the access terminal to carry out a set of functions including:
    periodically polling at least one network device via the access point for synchronization data according to a first data-synchronization interval, wherein synchronization data comprises data selected from the group consisting of new data and updated data;
    receiving from the access point information indicative of a number of access terminals being served by the access point in the coverage area;
    subsequent to receiving the information, making an interval-modification determination comprising a determination of a second data-synchronization interval based at least in part on a comparison of the number to a threshold value, the second data-synchronization interval being different in duration than the first; and
    subsequent to determining the second data-synchronization interval, periodically polling the at least one network device for synchronization data according to the second data-synchronization interval.

20. The access terminal of claim 19, wherein the interval-modification determination further comprises a determination that the number is greater than the threshold value, and wherein the second data-synchronization interval is accordingly responsively chosen to be longer than the first data-synchronization interval.

21. The access terminal of claim 19, the set of functions further comprising:
  while periodically polling according to the second data-synchronization interval, receiving during a given data-synchronization period an application-synchronization request from an application running on the access terminal, the given data-synchronization period being substantially equal in duration to the second data-synchronization interval, and responsively enforcing the second data-synchronization interval at least in part by not transmitting the application-synchronization request to the access point during the given data-synchronization period.

22. The access terminal of claim 19, the set of functions further comprising:
  while periodically polling according to the second data-synchronization interval, receiving during a given data-synchronization period an application-synchronization request from an application running on the access terminal, the given data-synchronization period being substantially equal in duration to the second data-synchronization interval, and responsively enforcing the second data-synchronization interval at least in part by, irrespective of whether or not a connection is actually currently available, providing to the application an indication that no connection is currently available.

23. The access terminal of claim 19, wherein the interval-modification determination further comprises a determination that the number is less than the threshold value, and wherein the second data-synchronization interval is accordingly responsively chosen to be shorter in duration than the first data-synchronization interval.

24. The access terminal of claim 19, wherein one or more applications that each have a respective data-synchronization interval are running on the access terminal, wherein the set of functions further comprises instructing the one or more applications to set their respective data-synchronization intervals to be no shorter in duration than the second data-synchronization interval.

25. The access terminal of claim 19, wherein one or more applications that each have a respective data-synchronization interval are running on the access terminal, and wherein periodically polling the at least one network device for synchronization data according to the second data-synchronization interval comprises maintaining one or more respective application-specific timers that enforce the second data-synchronization interval on a per-application basis.

26. The access terminal of claim 19, wherein one or more applications that each have a respective data-synchronization interval are running on the access terminal, and wherein periodically polling the at least one network device for synchronization data according to the second data-synchronization interval comprises allowing each respective application to transmit only one data-synchronization request in each of a plurality of subsequent time periods consistent with the second data-synchronization interval.

* * * * *